April 21, 1959
S. SABAROFF
2,883,616
RADIO FREQUENCY NOISE MEASUREMENT SYSTEMS
Filed Dec. 6, 1954
2 Sheets-Sheet 1
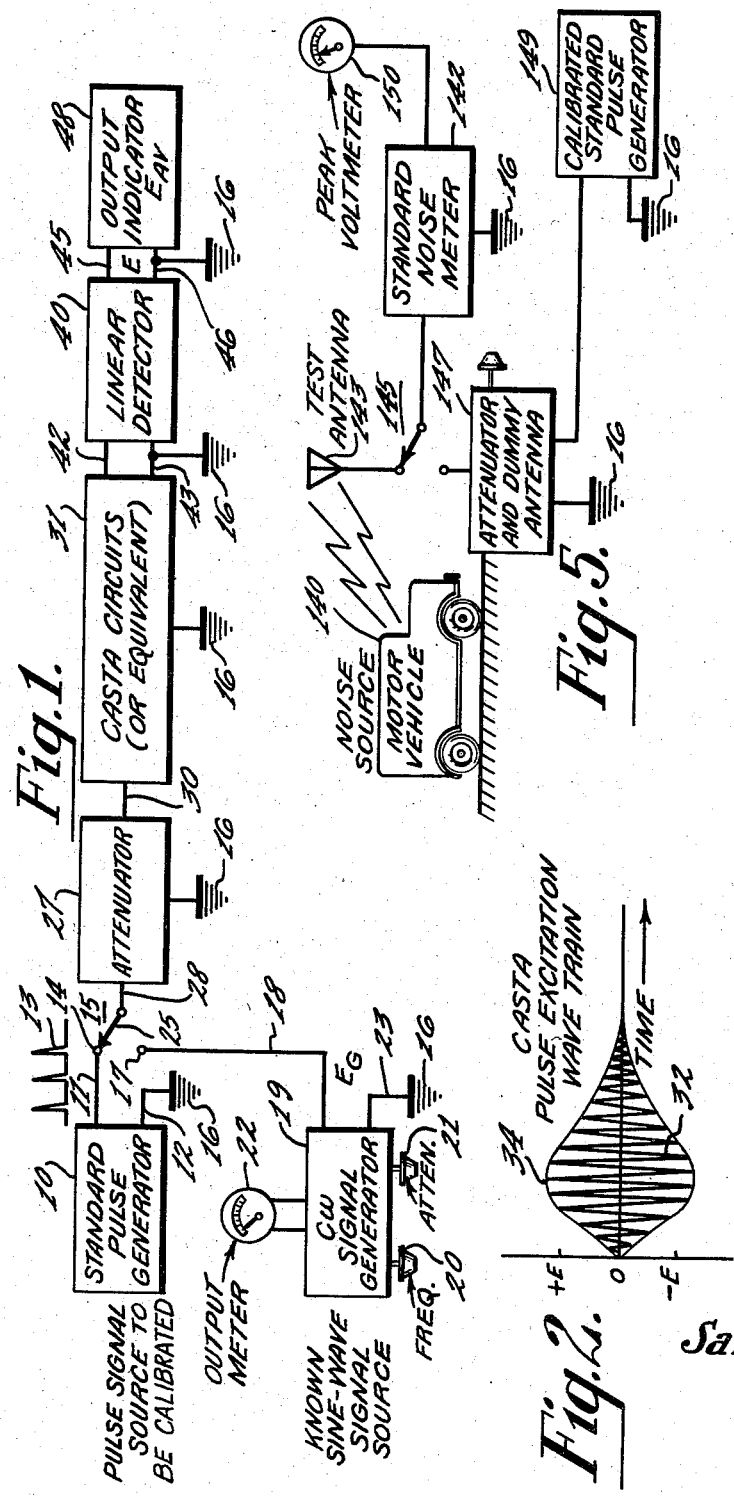
INVENTOR.
*Samuel Sabaroff*

INVENTOR.
Samuel Sabaroff

United States Patent Office 2,883,616
Patented Apr. 21, 1959

2,883,616

RADIO FREQUENCY NOISE MEASUREMENT SYSTEMS

Samuel Sabaroff, Havertown, Pa.

Application December 6, 1954, Serial No. 473,308

6 Claims. (Cl. 324—57)

The present invention relates to radio frequency noise measurement systems, and more particularly to a method and means for accurately measuring broadband or impulse type radio frequency interference which may adversely affect radio communications and like systems. The invention further relates to the calibration of noise meters used in such measurements.

The accurate measurement of radio frequency noise has become of increasing importance. The design of noise meters suitable for this purpose involves many considerations. In general, noise meters heretofore have consisted of radio receiver means coupled with a standard noise source such as a calibrated impulse generator. The accuracy of measurement is determined by the accuracy of calibration of the impulse generator.

It is therefore an object of this invention to provide an improved method and means for the absolute and accurate calibration of impulse noise generators.

Several methods have been developed for use in the absolute calibration of impulse noise generators. One method was described in the Proceedings of the IRE, vol. 32, No. 12, December 1944 titled, "Impulse Excitation of a Cascade of Series Tuned Circuits." This method depends on the response of a cascade of series tuned resonant circuits. The peak amplitude of the voltage response is shown to be proportional to the strength of an exciting impulse.

Another method depends on the response of a cascade of parallel tuned circuits, in which the peak amplitude of the voltage response may be shown also to be proportional to the strength of the exciting impulse.

It is a further object of this invention to provide an improved radio frequency noise measurement system which involves the measurement of the area under the envelope of a wave train resulting from an impulse excited combination of tuned circuits which may be termed a "casta." This system is particularly amenable to simplified construction and operation, and a complete measuring equipment in accordance with the invention has been built for this purpose which covers a continuous frequency range of 150 kc. to 1000 mc.

In essence the equipment comprises a number of superheterodyne signal selecting and converting units covering the required frequency range, with an intermediate frequency tuned circuitry and detector, designed and built to conform with the mathematically determined requirements, and a suitable C.W. signal generator, attenuator and switching circuits therefor.

Impulse-type radio-frequency interference is understood to be electrical disturbances generated by sudden changes in electric and magnetic potentials by operation of electric switching vibrating contacts and the like, by commutation, and arcing in electrical equipment. The resulting transients are broadband in character and contain radio frequency components which reach susceptible communications equipment through radiation, induction, conduction, or any combination of these phenomena and thereby produce interfering transients in the equipment. Inasmuch as radio frequency interference degrades the performance of communication equipment, it is necessary to be concerned with the measurement and elimination of this interference.

A peak transient response may be produced in a superheterodyne receiver by an unknown interference; then a stable standard calibrated impulse generator may be substituted for the unknown and the output of the standard adjusted to produce the same peak response in the receiver as the unknown. The standard impulse generator output intensity is then said to be equal to that of the unknown. The standard impulse signal is injected into the antenna input circuit of the receiver in such a manner that it sees the same series impedance, which includes the antenna impedance, as that seen by the unknown open-circuit E.M.F. inducted in the antenna. Thus, measurement accuracy is independent of differences in gain, selectivity, and phase characteristics of the receivers, and depends primarily on the stability and accuracy of the calibrated standard impulse generator.

One of the basic problems encountered in the substitution method of measurement is the calibration of the magnitude of the output of standard pulse generators over a certain frequency (RF) spectrum or band. It is also a further object of this invention, to provide an improved method and means for calibrating the output of standard pulse generators in terms of spectrum or spectral intensity.

Considering now this basic unit of measurement for radio frequency noise, a fundamental case of broadband radio frequency interference is that generated by a single idealized instantaneous voltage impulse exhibiting infinite amplitude, infinitesimally short duration, and a finite volt-time area. An actual physically realizable pulse approaches the limiting case of an idealized impulse when its time duration approaches zero and its amplitude becomes infinite while its volt-time area remains constant. Insofar as the response of an R-F circuit to a pulse is concerned, an actual pulse may be considered to be instantaneous when its time duration is short compared to the period of the upper pass-band cut-off frequency of the circuit.

Considering such broad-band radio-frequency interference, spectrum or spectral intensity in terms of volts per cycle, or micro volts per kilo cycle, etc. or bandwidth as a basic unit of measure therefor, may be defined. In order to define spectral intensity, use is made of theoretical idealized amplifier possessing a rectangular bandpass characteristic of unity gain having a lower frequency limit of $f_1$ and an upper frequency limit of $f_2$, and having a zero phase characteristic (phase as a function of frequency) within the pass-band. Phase characteristic at any frequency is defined as the shift in phase of an output sine-wave with respect to the corresponding input sine-wave. An amplifier with zero phase characteristic means one that does not shift the phase of an output sine-wave with respect to the input sine-wave for frequencies within its pass-band.

Spectral intensity of the ideal impulse is defined as the peak response in volts of the idealized amplifier to the impulse divided by the effective bandwidth of the idealized band amplifier or equivalent.

Spectral intensity S in volts per cycle of the bandwidth of an instantaneous impulse has been defined by means of the ideal unity-gain bandpass which has a rectangular amplitude and a zero phase characteristic. The impulse noise bandwidth of the ideal bandpass system is the frequency width of the rectangular amplitude characteristic. However, the ideal bandpass is not physically realizable, hence the actual is equated to an effective bandwidth.

It is possible to define impulse noise bandwidth of a physically realizable bandpass network such as a receiver or amplifier, by utilizing the response of its effective bandpass to an instantaneous impulse. Thus the peak response in volts divided by the product of spectral intensity and gain has the dimension of cycles/sec. and may be defined as the impulse noise bandwith of the bandpass. It depends on the chosen reference frequency inasmuch as the gain depends on the chosen reference frequency which is generally the center frequency or the frequency of maximum sinusoidal gain. However, the bandwidth gain product is constant and the peak response is proportional to the bandwidth. If the bandwidth is doubled, for example, the peak output voltage for a given impulse is doubled. The important point is that knowing the spectral intensity of the impulse S, the gain G of the bandpass at the chosen reference frequency, and the impulse noise bandwidth K associated with the chosen reference (center) frequency, the peak response V to an impulse can be computed. In other words:

$$V = SKG \quad (1)$$

It remains then to have the spectral intensity for each frequency of interest, be determined accurately by calibration of the noise meter used.

The bandpass amplifiers used in the measurement of spectral intensity in accordance with the invention, may include signal selecting and amplifying means, and may consist of one single shunt-tuned input circuit and two or more cascaded single shunt-tuned amplifier stages. In one embodiment of the invention, five tuned circuits are synchronously tuned and designed to have identical values of R, L, and C. These amplifiers or series of circuits may be termed "castas." Essentially they are a series of cascaded, synchronously tuned, RLC shunt circuits with amplifier tube isolation between stages.

The response of a casta to an impulse input is such that the output wave-form is essentially sinusoidal, of a frequency approximately equal to the resonant frequency of the casta and with an amplitude variation that is primarily exponential in form.

Considering the sine-area method of measuring spectral intensity in accordance with the invention, advantage is taken of the fact that the area under the envelope of the amplifier output due to an impulse is equal to the spectral intensity times the voltage gain of the amplifier at center frequency. If the amplifier output is rectified or detected, the average rectified current will be proportional to the area. This leads to the present method and system for measuring spectral intensity. After the rectified current due to an impulse input has been noted, a sine-wave generator is substituted for the impulse source. The generator output is adjusted until the same value of rectified current is obtained. The spectral intensity is given by the peak value of the input sine-wave divided by the repetition rate of the impulses.

It can be shown that the accuracy of the sine-area method is not dependent on the need for identical RLC shunt tuned circuits in the casta.

Analysis shows further, that regeneration increases the gain without changing the independence of the area measurement on the circuit parameters. In effect, therefore, moderate positive feedback or regeneration stretches the output pulse wave trains of a casta, thus increasing the duty cycle, without appreciably affecting the area method of measurement.

From the foregoing consideration, it will be seen that a radio-frequency noise measuring system, in accordance with the invention, may involve the measurement of the area under the envelope of a wave train resulting from an impulse excited combination of tuned circuits that are herein broadly referred to as a casta. The envelope of the wave train as derived from a linear detector connected with the casta, is a pulsating D.C. current or voltage that may be applied to an indicating device which, in turn, will indicate the average amplitude of the rectified voltage wave. In a simplified form of the device, a D.C. volt-meter may be used as the output indicator if the pointer system or movable element of the meter has suitable inertia to act as an electro-mechanical low-pass filter with a cut-off frequency below that of the lowest repetition rate of the rectified envelopes.

The equivalent sine-area method for measuring spectral intensity in accordance with the invention, is as follows:

It has been determined that the area under the envelope of the casta response to a single pulse is equal to SG, where S is the spectral intensity and G is the gain of the casta, viz:

$$\int_0^\infty m(t)\,dt = SG \quad (2)$$

Let us assume that the pulses are repeated at a rate equal to F per second, and that negligible overlap exists. The area of a single pulse is expressed by the relation:

$$\int_0^\infty m(t)\,dt = \frac{E_{av}}{F} \quad (3)$$

where $E_{av}$ is the average voltage output. This voltage can be measured, for instance, by a simple D.C. voltmeter, wherein the meter acts as an electro-mechanical low pass filter with a cut-off frequency below that of the lowest repetition rate.

Equating 2 and 3 results in the following expression for spectral intensity:

$$S = \frac{E_{av}}{FG} \quad (4)$$

The sine-wave gain of a casta may be determined by taking the ratio of peak output voltage to peak input voltage at center frequency, thus $$G = \frac{E_{out}}{E_{in}} \quad (5)$$

For the purpose of gain determination, $E_{out}$ may be set to the same value as $E_{av}$. When this is done and Equation 5 is substituted in Equation 4, there results finally, $$S = \frac{E_{in}}{F} \quad (6)$$

The procedure for determining spectral intensity by means of the sine-area method is therefore as follows:

(a) Feed the pulse signal of known repetition rate (standard pulse generator) into the casta, (b) Adjust the gain of the casta or the signal attenuation until there is a reasonable deflection on the output indicating meter, (c) Replace the pulse signal with a sine wave generator operating at the casta center frequency. Vary the output of the generator until the output indicating meter reads the same as for the pulse generator. The spectral intensity in volts per cycle is then given directly by dividing the sine-wave generator output volts by the repetition rate in pulses per second, as indicated in Equation 6.

In a similar manner the output of the standard pulse generator may be calibrated for other repetition rates or frequencies of operation, which when completed provides a complete calibration for any desired frequency range in which the pulse generator may be used.

In accordance with the invention, to provide this method of impulse or broadband radio-frequency interference measurement, the casta circuits may involve not only a series of synchronously tuned circuits with amplifier tube isolation between stages, but also broadband signal tuner and converter means preceding such circuits, and having a wider frequency band of response than the casta amplifier circuits.

Into such a system through a suitable attenuator and selective switching means are applied alternatively the signal output from an unknown pulse signal source to be calibrated, such as a standard pulse generator, and the output of a C.W. signal generator which provides a known sine-wave signal source.

To the output of the casta circuits there is connected a linear detector or rectifier which rectifies the signal envelope of the wave train resulting from pulse excitation of the casta circuits, and the output voltage is applied to an output indicator which will indicate the average amplitude of such voltage.

The novel features that are considered to be characteristic of this invention are set forth with particularity in the appended claims, the invention itself, however, both as to its organization and method of operation, as well as additional objects and advantages thereof will best be understood from the following description when read in connection with the accompanying drawings in which:

Figure 1 is a schematic circuit driagram in block form showing a radio frequency noise measurement system in accordance with the invention;

Figures 2 and 3 are graphs showing curves indicating certain operating characteristics of the system of Figure 1;

Figure 4:
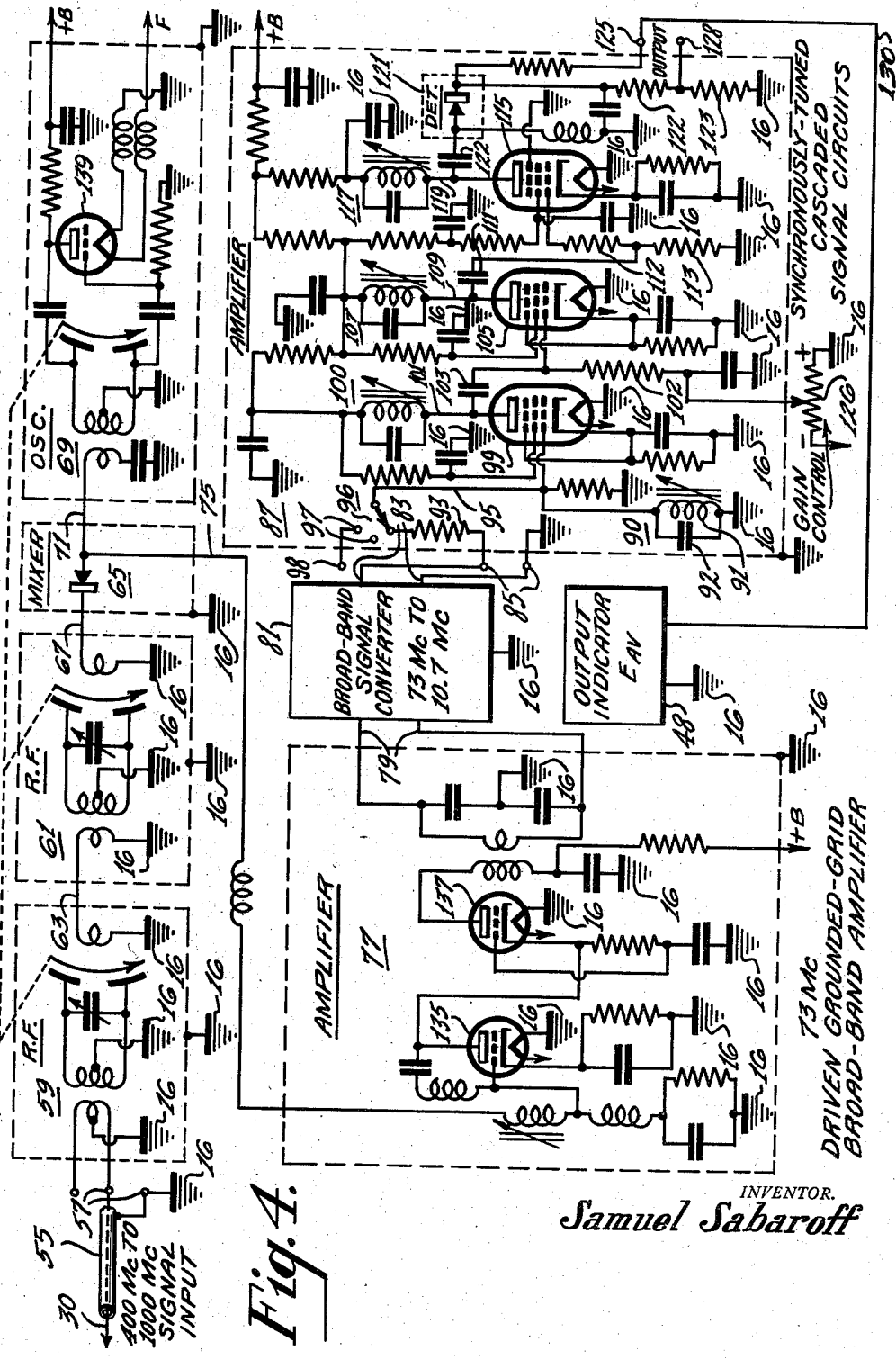
Figure 4 is a schematic circuit diagram of certain of the elements of the system of Figure 1 showing the details thereof and further illustrating the invention.

Figure 5 is a schematic circuit diagram and graphical representation of a system for utilizing a calibrated standard pulse generator in the field for the accurate determination of noise after calibration of the pulse generator in accordance with the invention; and Figure 6 is a graph showing a curve representing the resultant calibration of a standard pulse generator in accordance with the invention, for use in the system shown in Figure 5.

Referring to the drawings in which like elements throughout the several figures are designated by like reference characters, and referring in particular to Figures 1, 2 and 3, a standard pulse generator 10 or similar source of unknown pulse signals is provided with an output circuit 11—12 to which are applied output voltage pulses 13 having a predetermined repetition rate or frequency. One lead 11, of the output circuit is connected to one contact 14, of a selector switch 15, while the lead 12 of the output circuit is connected to the system ground indicated at 16.

A second contact 17 of the switch 15 is connected through output leads 18 and 23 for a C.W. signal generator 19 having a frequency control means 20, attenuation control means 21, to an output meter 22 reading voltage across the output circuit 18—23. The second output lead 23 is connected to system ground 16.

The movable selector arm or contact 25 of the switch 15 is connected to a suitable attenuator 27 through a connection lead 28 and ground 16 to which the attenuator is also connected as indicated. With this arrangement, signals may be selected by the switch 15 from either the standard pulse generator, or unknown source, or from the C.W. signal generator or known source, and applied to the attenuator by which the amplitude of signals from both sources is controlled.

As indicated in the diagram, the attenuator in turn is coupled through an output circuit 30 which includes system ground 16, to a tuning system 31 which includes a series of synchronously-tuned, cascaded signal circuits with electronic tube or equivalent isolation between stages or circuits. This may be termed a casta. The response of such a system of tuned circuits to pulse excitation from the standard pulse generator when the switch 15 is moved to the position shown in the drawings, is as represented by the oscillatory wave 32 of Figure 2 which has an overall response envelope 34. This is a response of the casta to a single-pulse and this response is repeated for each pulse. If the wave train of such a series of tuned circuits is rectified the resultant D.C. wave is as indicated by the curve 36, and the curve 38 in Figure 3.

To provide such rectification, a linear detector or rectifier 40 is coupled to the output circuit 42—43 of the casta, one side 43 being connected to system ground 16, and the output circuit 45—46 of the linear detector is in turn coupled to an output indicator 48 which will indicate the average amplitude of the voltage waves 36, 38, etc. as indicated by the dotted voltage line 50 in Figure 3. One side of the output circuit 46 is connected to system ground 16 as indicated.

With this system, a pulse signal from a standard pulse generator is applied to the casta circuits 31 through the attenuator 27 and the switch 15 by way of the contact 14 as shown, and the gain of the attenuator is adjusted until there is a readable and appreciable deflection on the output indicating device 48. The latter may be a D.C. volt-meter having a moving vane indicator or the like. This deflection is read and noted. The movable contact 25 of the switch 15 is then moved to the contact 17 thereby replacing the pulse signal with a sine-wave signal from the generator 19. The frequency of the sine-wave generator is set for the center frequency of the casta and the output of the sine-wave generator is varied by its own attenuator means 21 until the output indicator 48 registers the same indication as for the pulse generator.

The spectral or spectrum intensity in volts per cycle may then be derived directly by dividing the sine-wave signal generator peak output voltage by the repetition rate of the pulses per second as indicated by Equation 6 hereinbefore given. In a similar manner the spectral intensity is obtained for other repetition rates or radio-frequencies of the pulse generator until it is fully calibrated for any desired range of pulse repetition rates and radio-frequencies. It should be noted that, as pointed out hereinbefore, the response of the casta to an impulse signal is such that the output wave form is essentially sinusoidal and of a frequency approximately equal to the resonant or center frequency of the casta and with an amplitude variation that is primarily exponential in form. Thus advantage is taken also as hereinbefore referred to, of the fact that the area under the envelope of the casta output due to an impulse is equal to the spectral intensity times the voltage gain of the casta at center frequency. The casta output, if rectified, provides an average rectified current which is proportional to the area under the output envelope. The response is also independent of the bandwidth of the casta circuits and is independent of the operation of the linear detector or amplifier so long as it is provided with sufficient signal strength to cause it to operate on a substantially straight portion of its rectified output characteristic curve.

The actual operating circuits that may be provided for the casta 31, the linear detector 40 and the output indicator 48 of Figure 1, for response to pulse signals in the range between 400 mc. and 1000 mc., are shown in detail in Figure 4 to which attention is directed for a further understanding of the invention. In this arrangement, the output lead 30 from the attenuator is provided with a suitable shield 55 and connected to input terminals 57 of a broadband high-frequency signal tuner and converter which comprises a series of variably tuned RF circuits 59 and 61 provided with a link coupling circuit 63 having connections with the common system ground 16 as indicated, and providing for the transfer of signals from the input terminals 57 to a mixer or rectifier 65 which in turn is coupled with the second tuner 61 through a link coupling circuit 67. A tunable oscillator 69 is also coupled with the rectifier 65 through a link coupling circuit 71. Both RF stages or circuits and the oscillator are tuned by uni-control means indicated by the line connections 73. The output from the signal mixer 65 is taken through an output circuit lead 75 and applied to a two-stage driven grounded-grid broadband amplifier 77 which operates in the present example at 73 mc. as derived from the mixer stage 65.

The amplifier signal output at 73 mc. is applied through the output circuit 79 to a second broadband signal converter 81 which may be of similar construction to the first converter. This converts the signal at 73 mc. to 10.7 mc., and the output circuit 83 of the second converter 81 is connected to input terminals 85 of a casta amplifier 87. The amplifier 87 may have a band pass substantially less than the pass band of the preceding signal tuner, amplifier and converters. However, this will be further discussed hereinafter. The amplifier is thus preceded by signal selecting and amplifying means for converting the signals in the range of 400 mc. to 1000 mc. to the relatively low frequency 10.7 mc. center frequency of the amplifier 87.

This amplifier consists of a single shunt-tuned input circuit 90 comprising a suitable movable core tuning inductor 91 and a shunt tuning capacitor 92. This is connected between system ground 16 and an input lead 95 which is selectively connectable through a switch 96 with the input terminals 85 for normal operation, to an off position 97 or to a test input terminal 98. Signals impressed upon the tuned circuit 90 are conveyed through a coupling amplifier tube 99 to a second tuned circuit 100 similar in construction to the tuned circuit 90 and connected in the output anode circuit 101 of the amplifier tube 99.

The tuned circuit 100 is coupled through a coupling capacitor 103 and a second amplifier tube 105 to a similar shunt-tuned circuit 107 in the output anode circuit 109 of the tube 105. In a similar manner, the signal output from the tuned circuit 107 is coupled through a coupling capacitor 111, a voltage divider network 112—113 and an amplifier tube 115 to a third tuned circuit 117 in the output anode circuit 119 of the tube 115. Signals appearing across the tuned circuit 117 are applied to a detector or rectifier 121 through a coupling capacitor 122, and the rectified signal output is taken across an output resistor network 122 and 123 and applied between an output terminal 125 and system ground 16. A suitable gain control means indicated by the grid control potentiometer 126 is provided for the amplifier 87.

The resistive loads across the tuned circuits 90, 100, 107 and 117 are provided by resistors 93, 102, 113 and the rectifier load respectively.

An auxiliary output terminal 128 is also provided on the network 122—123. The rectifier output terminal 125 is connected through an output lead 130 with the output indicator 48 which may be any suitable device or system for reading the average value of the voltage delivered by the rectifier or detector 121.

It will be noted that the amplifier 87 comprises a shunt-tuned input circuit 90 and cascaded shunt-tuned amplifier stages. In the present example, a total of four circuits are shown, although more may be provided to provide a longer pulse excitation wave train in response to a signal wave pulse, and it should be further noted that the four circuits are synchronously tuned, that is, to the same frequency and may have substantially identical values of resistance, inductance and capacitance. Thus the casta circuits of the system provide a series of cascaded, synchronously tuned, RLC shunt circuits with amplifier tube isolation between stages.

Other types of circuits may be utilized in obtaining the response shown by the shunt LRC circuits described in casta 87. Two loosely coupled shunt-tuned circuits may be shown to be equivalent to two shunt LRC circuits with vacuum tube isolation, for example. It is possible also to obtain the effect of the casta response discussed above, by arrangements of R and C with suitable feedback circuits. An example of an RC circuit is a Wien bridge with essentially positive feedback.

The broadband signal tuner and converter, and the broadband signal converter 81 may be replaced by an arrangement that exhibits the qualities of the casta 87.

A mathematical derivation of the output of a typical casta is shown below:

The casta is a cascade of current limited pentode stages with parallel RLC plate loads. The $p$ function for the casta response to an impulse of area A is easily shown to be $$E(p) = AG\left[\frac{2\alpha p}{(p+\alpha)^2+\beta^2}\right]^n \quad (7)$$

where $$\alpha = \frac{1}{2RC}$$

$n$ = number of stages $G$ = center frequency gain $$\beta = \sqrt{\frac{1}{LC}-\alpha^2}$$

Equation (7) may be rearranged:

$$\frac{E(p)}{AG(2\alpha p)^n} = [(p+\alpha)^2+\beta^2]^{-n} \quad (8)$$

The right hand side of Equation 8 has been tabulated and its inverse is $$[(p+\alpha)^2+\beta^2]^{-n} \rightarrow \frac{t^{n-1}\epsilon^{-\alpha t}}{2^{n-1}\beta^n(n-1)!}\sqrt{\frac{\pi\beta t}{2}}J_{n-\frac{1}{2}}(\beta t) \quad (9)$$

Inserting 9 in Equation 8, there is obtained $$E(p) \rightarrow \frac{2AG}{(n-1)!}\left(\frac{\alpha}{\beta}\right)^n \frac{d^n}{dt^n}\left[t^{n-1}\epsilon^{-\alpha t}\sqrt{\frac{\pi\beta t}{2}}J_{n-\frac{1}{2}}(\beta t)\right] \quad (10)$$

in which $p$ has been written as $d/dt$. It can be shown that this is valid in this case by use of the Initial Value Theorem. $J_{n-\frac{1}{2}}(\beta t)$ is a Bessel function of the first kind.

In Equation 10 the quantity $$\sqrt{\frac{\pi\beta t}{2}}J_{n-\frac{1}{2}}(\beta t)$$

is a terminating series of sines and cosines in which the dominant term is $$\cos\left(\beta t - \frac{n\pi}{2}\right)$$

thus $$\sqrt{\frac{\pi\beta t}{2}}J_{n-\frac{1}{2}}(\beta t) = \cos\left(\beta t - \frac{n\pi}{2}\right) \quad (11)$$

approximately.

Equation 10 may be written $$E(p) \rightarrow \frac{2AG}{(n-1)!}\left(\frac{\alpha}{\beta}\right)^n \frac{d^n}{dt^n}\left[t^{n-1}\epsilon^{-\alpha t}\cos\left(\beta t - \frac{n\pi}{2}\right)\right] \quad (12)$$

It will now be assumed that the amplitude of the cosine term in Equation 12 is a slowly varying function. The differentiation can therefore be applied to the cosine term only, giving the following approximate expression for the casta output $$V_n(t) = 2AG\frac{\alpha^n}{(n-1)!}t^{n-1}\epsilon^{-\alpha t}\cos(\beta t) \quad (13)$$

The envelope of Equation 13 is $$m(t) = 2AG\frac{\alpha^n}{(n-1)!}t^{n-1}\epsilon^{-\alpha t} \quad (14)$$

The area under the envelope is easily shown to be $$\int_0^\infty m(t)dt = SG \quad (15)$$

where $S = 2A$.

The driven grounded-grid broadband amplifier 77 comprises two amplifier tubes 135 and 137 which may each be ½ of a 6BQ7A commercial type tube, while the tubes 99, 105 and 115 of the amplifier 87 may be respectively of the commercial types known as 6AK5, 6BA6 and 6CL6 pentodes. The tube in the oscillator system indicated at 139 may be of the commercial type known as a 6AF4 while the rectifier or mixer 65 may be a commercial type known as 1N82. The rectifier detector 121 connected with the amplifier 87 may likewise be a commercial type known as 1N81.

In operation, the broadband signal tuner and converter comprising elements 59, 61 and 69 are tuned to a selected frequency in the operating range which is presently considered to be 400 mc. to 1000 mc. and receives signals from the standard pulse generator or other unknown source and from the C.W. signal generator of Figure 1 through the selector switch 15 and the attenuator 27 via the output lead 30, and amplifies and converts the received signal to a signal of 10.7 mc. for application to the cascaded tuned circuits 90, 100, 107 and 117 for effecting pulse excitation wave trains as indicated in Figure 2 and hereinbefore described.

The detector 121 rectifies the wave trains and provides the rectified DC output current or voltage as represented by the DC response characteristic curves shown in Figure 3, and the output indicator 48 connected with the output terminal 125 through the lead 130 and system ground, provides for the derivation of the average voltage for a determination of the impulse intensity in terms of spectral or spectrum intensity as hereinbefore described.

Other broad band signal tuner and converter means may be connected in the circuit of Figure 4 to provide for signal response in other frequency ranges as is obvious. In one embodiment of the invention the circuits of Figure 4 have been provided for the selection of signals in various ranges between 150 kc. and 1000 mc., for calibrating a variety of impulse signal generators as required for field or laboratory use in testing equipment for noise generation.

The manner in which a calibrated standard pulse generator is used in the field is indicated by reference to Figure 5 to which attention is now directed along with Figure 6.

A noise source such as a motor vehicle 140 is to be tested to determine the extent of its radio frequency noise generation as a possible location for a communications type receiver.

A standard noise meter 142 having a test antenna 143 placed in or near the receiver location or near the vehicle as indicated, is connected to a selector switch 145 which provides selective connections for the noise meter with either the test antenna or a dummy antenna and attenuator 147, through which signals are supplied from a calibrated standard pulse generator 149. The peak voltmeter indicator for the noise meter is indicated at 150. The dummy antenna, noise meter and pulse generator are connected to ground or a common return circuit as shown. The noise meter is connected to the test antenna through the switch 145 and the peak voltage reading is taken with the motor vehicle engine running or with equipment operating therein which may generate undesired radio-frequency noise.

The peak volt meter reading is noted and the switch is then moved to connect the calibrated standard pulse generator with the noise meter through the attenuator and dummy antenna which is adjusted to provide the same peak volt meter reading. The volts per cycle or spectral intensity at the radio frequency of interest may then be read from a calibration curve of the impulse generator as derived by previous calibration as described, in accordance with the invention. Such a curve 165 is shown in Figure 6. This is plotted between frequency and spectral intensity. The curve 165 is a typical calibration curve for impulse generators. Frequency points of interest $f_0$, $f_1$, $f_2$, etc. are marked on this curve for reference, and knowing the frequency, the spectral intensity may be determined directly.

Knowing the spectral intensity of the impulse (S) and since the gain (G) of the bandpass of the proposed receiver is known and likewise the impulse noise band width (K) associated with this receiver at the radio frequency of interest, the peak response (V) of such a receiver in that location may be computed from the formula below:

$$V = SKG$$

The peak response to an impulse for other frequencies of interest can be determined accurately in the same manner.

From the foregoing description it will be seen that the method and system of the invention provides for improved radio frequency noise measurement and involves measurement of the area under the envelope of a wave train resulting from an impulse excited combination of tuned circuits or casta. This system permits of simplified construction and operation with a complete and accurate calibration of impulse noise generators in any desired useable frequency range.

By calibrating the magnitude of the output of a standard impulse generator over a predetermined frequency spectrum or band with a high degree of accuracy, field tests of equipment may be made with accuracy in a simplified and ordinary set up similar to that shown in Figure 5, and all measurements may be made in terms of the basic unit of measure, which is spectral intensity given either in volts per cycle or micro volts per kilocycle, etc.

The effectiveness of the sine-area method for measuring spectral intensity is clearly demonstrated by the prior consideration of the equations and their relation to the operation of the system as hereinbefore described.

What is claimed is:

1. In a radio frequency noise measurement calibration system, the combination of, a signal tuner and converter selectively responsive to signals in a predetermined high frequency band and having a signal mixer output circuit, an amplifier coupled to said output circuit for receiving signals therefrom at a predetermined intermediate frequency, means providing a single shunt-tuned input circuit for said amplifier and a plurality of cascaded single shunt-tuned circuits coupled to said first named circuit and all synchronously-tuned for establishing signal wave trains therein in response to impulse excitation, said amplifier having a signal output circuit, a linear signal rectifier coupled to said output circuit, means coupled to said signal rectifier for indicating the average amplitude of rectified signals from said rectifier, means for selectively applying to said circuits standard pulse generator signals at known repetition rates and continuous-wave signals at substantially the center frequency of the response of said circuits, and means for determining the peak signal voltage of the applied CW signals for each repetition rate of the applied pulse generator signals, said peak signal voltage being adjusted to provide the same average amplitude of rectified signals as said pulse generator signals.

2. The method of calibrating a standard impulse generator for determination of impulse intensity in terms of spectral intensity in volts/cycle of bandwidth of a bandpass network which comprises pulse exciting a series of synchronously-tuned cascaded shunt signal circuits by signals of predetermined repetition rate from said generator, deriving by linear detection the envelopes of the pulse excitation wave trains from said circuits, deriving an indication of the average amplitude of said envelopes, selectively applying sine-wave signals to said circuits at the center frequency thereof, controlling the peak voltage of said applied sine-wave signals to attain an output indication of the same average amplitude as the first named indication, and determining said peak voltage of the sine-wave signals and dividing by the repetition rate of said excitation signals as a measure of the signal intensity of the applied pulses from the pulse generator.

3. A radio frequency noise measurement calibration system for standard pulse signal generators and the like, comprising a high frequency signal amplifier having input and output circuits and a plurality of synchronously-tuned cascaded shunt signal translating circuits therebetween for establishing signal wave trains therein in response to impulse excitation, a substantially linear detector connected to the output circuit, a direct current indicating meter connected to said rectifier for indicating the average value of the rectified signal output therefrom, said meter having a movable indicating element effectively operating to provide an electromechanical low-pass filter with cut-off frequency below that of the lower repetition rate of pulses to be measured, a signal attenuator connected with the input circuit of said amplifier, a sine-wave generator, switch means connected with said attenuator for applying signals from a standard pulse signal generator or signals from said sine-wave generator to said attenuator alternatively, means for reading the peak output voltage of said sine-wave generator, means for varying the sine-wave generator signal frequency to provide signals within the pass band of said signal translating circuits, and means for adjusting the peak output voltage of said generator to provide the same average value of rectified signal output as for applied pulse signals at each repetition rate of pulses to be measured.

4. A sine-area method of measuring spectral intensity of impulse noise generators and the like, which comprises effectively measuring the area under the envelope of the output wave form of a synchronously-tuned amplifier with shunt-tuned cascaded stages in response to an impulse signal of known repetition rate by deriving the average value of the rectified output from said amplifier resulting from said signal as an indication of said area, measuring the peak value of an applied continuous-wave signal at the center frequency of the pass band of the amplifier adjusted to provide the same average value of rectified output, and deriving the spectral intensity for said repetition rate by dividing said peak value by said repetition rate.

5. In measurement apparatus for radio frequency noise, a pulse generator calibrating system comprising in combination, a plurality of synchronously-tuned cascaded shunt signal circuits responsive to impulse excitation for establishing signal wave trains therethrough, means for applying pulse signals of predetermined repetition rate or frequency to said circuits in cascade for affecting impulse excitation thereof, substantially linear rectifier means coupled to said circuits for receiving and rectifying said signal wave trains, output indicator means coupled to said rectifier for deriving an indication of the average amplitude of the output current from said rectifier, the average rectified current for each repetition rate being thereby proportional to the area under the envelope of the signal circuit output due to applied pulse signals, means for selectively applying sine-wave signals to said circuits at substantially the center frequency thereof, means for controlling the amplitude of said last-named signals to provide the same output indication of said output indicator means for both pulse and sine-wave signals, and means for reading the peak voltage of said applied sine-wave signals for each repetition rate or frequency of said applied pulse signals to determine spectral intensity in accordance with the formula S equals applied peak sine-wave signal voltage divided by the repetition rate per second of the applied pulse signals.

6. In measurement apparatus for radio frequency noise, a pulse generator calibrating system comprising in combination, a plurality of synchronously-tuned cascaded shunt bandpass signal circuits for establishing signal wave trains therein in response to impulse excitation, substantially linear rectifier means coupled to said circuits for receiving and rectifying said signal wave trains, output indicator means coupled to said rectifier for deriving an indication of the average amplitude of the output current from said rectifier, means for applying pulse signals of predetermined repetition rate or frequency to said circuits in cascade for affecting impulse excitation thereof, means for selectively applying sine-wave signals to said circuits at substantially the center frequency thereof, means for controlling the amplitude of said last-named signals to provide the same output indication of said output indicator means for both pulse and sine-wave signals, and means for reading the peak voltage of said applied sine-wave signals for each repetition rate or frequency of said applied pulse signals, thereby effectively to provide a measure of the area under the envelope of wave trains resulting from said impulse excitation in terms of spectral intensity in accordance with the formula S equals applied peak sine-wave signal voltage divided by the repetition rate per second of the applied pulse signals.

References Cited in the file of this patent

UNITED STATES PATENTS 2,578,348     Gannett     Dec. 11, 1951

OTHER REFERENCES

"Proceedings of the I.R.E.," December 1944, pp. 758–760.